United States Patent [19]

Murray et al.

[11] 4,170,346
[45] Oct. 9, 1979

[54] BINDERY CALIPER

[75] Inventors: Robert R. Murray, Indialantic, Fla.; Dale H. Jackson, Bethlehem, Pa.

[73] Assignee: Harris Corporation, Melbourne, Fla.

[21] Appl. No.: 848,262

[22] Filed: Nov. 3, 1977

[51] Int. Cl.² .......................................... B65A 39/02
[52] U.S. Cl. .................................... 270/54; 270/56; 340/675
[58] Field of Search ................... 270/56, 54; 271/262–263; 93/93 C; 214/1 MD; 324/61 QS, 61 QL; 209/81 R, 88 S; 340/259, 674–675

[56] References Cited

U.S. PATENT DOCUMENTS

| 3,400,331 | 9/1968 | Harris | 324/61 QS |
| 3,561,752 | 2/1971 | McCain | 270/54 |
| 3,609,735 | 9/1971 | Dauterman | 340/259 |

Primary Examiner—Edgar S. Burr
Assistant Examiner—A. Heinz
Attorney, Agent, or Firm—Craig and Antonelli

[57] ABSTRACT

A bindery caliper is provided in the form of a non-contacting capacitive change measuring device capable of determining the page count of a multi-page stack with high sensitivity. The capacitance of a pair of plates between which the stack of pages is disposed sets the frequency of an oscillator which is sampled for a predetermined time period. The sampled pulses are counted and compared to a standard within tolerances, and the comparison determines whether the page count is satisfactory. Means for updating the standard value on the basis of accumulated measurements is also provided.

26 Claims, 13 Drawing Figures

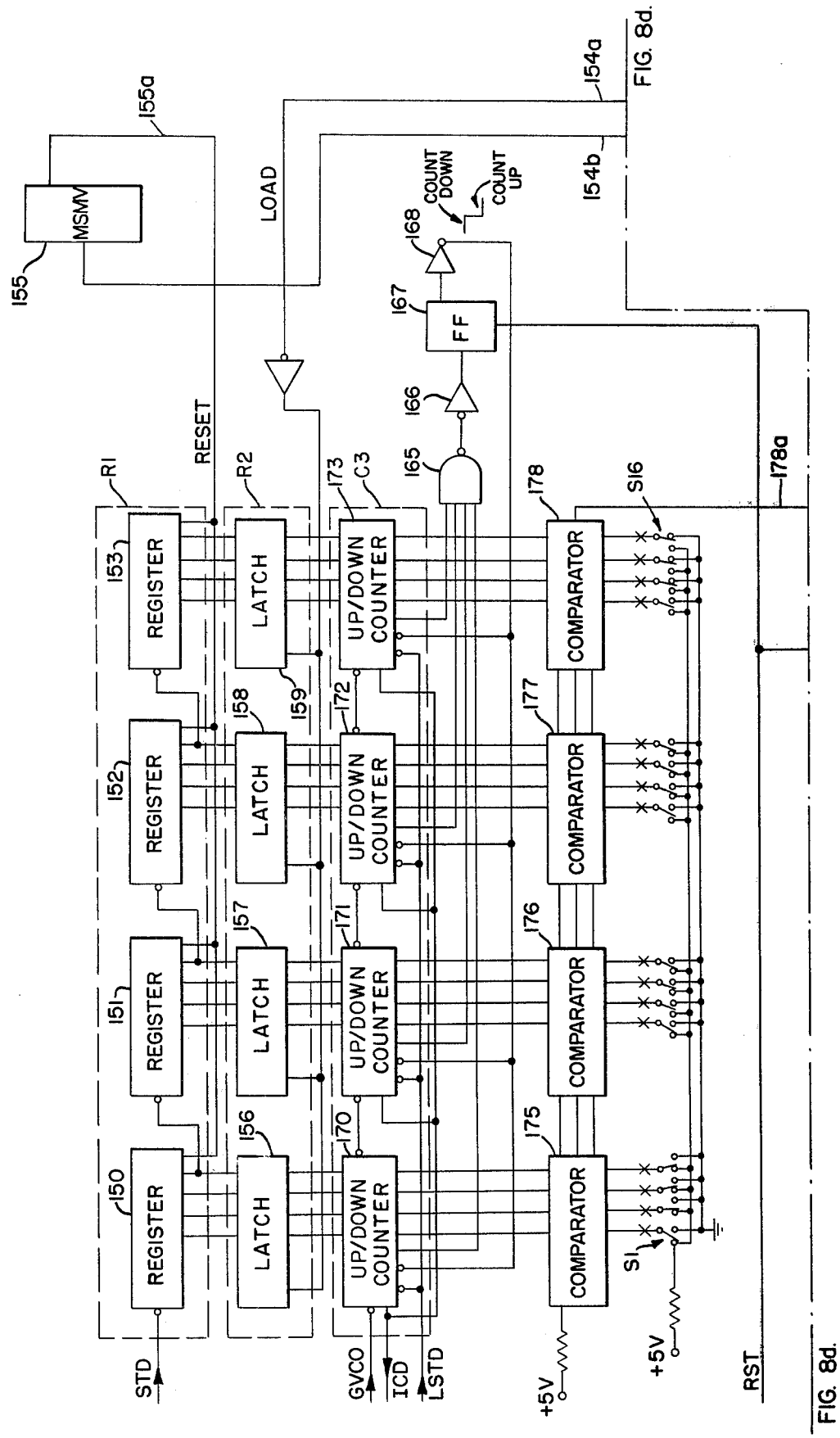

BINDERY CALIPER

The present invention relates in general to a bindery caliper, and more particularly, to a non-contacting capacitive change measuring device for use in determining the page count of a multipage book.

The problem of automatically counting paper pages is addressed in many areas, including book binding, newspaper assembly, money counting, Xerography, etc. The solutions to these problems seem to have developed along two distinct lines; in one, each piece of paper is separately counted with the sum being the total count, while in the other, some parameter created by the entire stack is measured and this is compared with a standard to establish deviations in count. Devices falling into the first-mentioned class, i.e., those devices which seek to separately count each piece of paper to arrive at a total count are generally extremely complicated, expensive to manufacture and are not adaptable to all types of manufacturing and handling processes. The present invention falls within the second-mentioned class of devices in which the parameter of the stack is measured and compared with a standard to determine the total count.

Bindery calipering devices currently used require some type of mechanical pressure and lever actuation to function properly. Such devices generally measure the thickness of the stack to determine total count, and as such, do not operate with sufficient sensitivity to detect, for example, the absence of a single sheet or provision of an additional sheet in a sizable stack. Non-contacting methods are also in use, but such methods generally have been incapable of determining the absolute thickness of a product being measured since they are designed primarily to detect only the total presence or absence of the product.

Thus, while the prior art includes both mechanical devices and electro-optical systems for measuring thickness, such devices and systems for the most part are incapable of providing the sensitivity necessary to detect small deviations in the number of sheets of paper in a stack. This is particularly critical in the area of bookbinding, where it is necessary to count the number of pages in the book prior to stitching to ensure that the book is complete, containing exactly the number of pages required without deviation. Thus, a bindary caliper for use in connection with bookbinding must necessarily provide a sensitivity sufficient to detect the absence of a single page or the presence of a single additional page in a book of at least 100 pages.

In accordance with the present invention, a method and apparatus is proposed for detecting the presence of paper and for measuring the thickness of a stack of sheets to verify that the correct number is present. Adaptive control means is also proposed to continually correct for variations in individual sheet thickness which is normally encountered in the printer-binder process environment. It is also contemplated that books having pages including a paper splice, which pages will have an increased thickness, are detected along with those books having an incorrect number of pages. In this way, books having deviations in the page counts as well as defective pages of increased thickness will be detected and rejected automatically prior to the binding thereof.

One object of the present invention is to provide a system for rapidly and accurately determining the page count of books as they move along a bindery assembly line.

Another object of the present invention is to provide a system of the type described which is capable of inhibiting the stitching of any book having an improper page count and then causing those books having the improper page count to be rejected from the bindery assembly line.

A further object of the present invention is to provide a system of the type described which is capable of detecting books having pages of increased thickness, although possibly proper page count, and for rejecting such books.

In particular, the present invention is carried out by detecting the capacitance change produced by a number of sheets of paper placed between the plates of a capacitor. In this regard, a book is passed through the air gap of a parallel plate capacitor where variations in the pages will create a related dielectric variation which in turn affects the capacitance of the parallel plate capacitor. The capacitor forms a part of a variable frequency oscillator whose frequency is a function of the capacitance of the capacitor and therefore of the page count. In a preferred embodiment, the capacitor is coupled to a wein bridge oscillator and forms the timing capacitor therein.

Another aspect of the present invention resides in the fact that amplifiers are used to drive the shields of the conductors coupling the measuring capacitor to the oscillator to the same voltage as the signal conductors, thus canceling the effect of capacitance between the shield and signal conductors. In this way, a sensitivity which permits the detection of one missing page, or one additional page, per one hundred book pages is achieved.

The frequency of the oscillator associated with the measuring capacitor is compared to a predetermined standard to determine whether the total number of pages of each book being measured is the same as the standard. In this regard, the comparison operation is controlled on the basis of preselected tolerances which take into account normal temperature, paper and other variations in determining whether the book being measured is a "good book" or a "bad book" from the point of view of the number of pages thereof or other abnormalities detected by the system. One of the features of the present invention is to provide means for accumulating a predetermined number of consecutive measurements of "good books" to use as a measure for updating the standard to which the oscillator frequency is compared so that the reject limit standard will be automatically compensated for variations in temperature, humidity, type of paper and other factors.

A count of the total number of books measured and the total number of rejects is also provided within the system. This signal may be utilized to analyze when and how many rejects are occurring thereby providing an overall indication of the quality of the books being provided to the measuring system. Such data may be compiled and analyzed, for example by a central computer or a microprocessor to provide indications of system operations.

These and other objects, features, and advantages of the present invention will be explained more fully in the following detailed description of the present invention when taken in conjunction with the accompanying drawings, wherein:

FIG. 3b is a longitudinal sectional view of the capacitive detector head taken along line III—III in FIG. 3a;

FIGS. 8a, 8b, 8c and 8d are schematic circuit diagrams of a logic circuit in accordance with the present invention.

Figure 1:
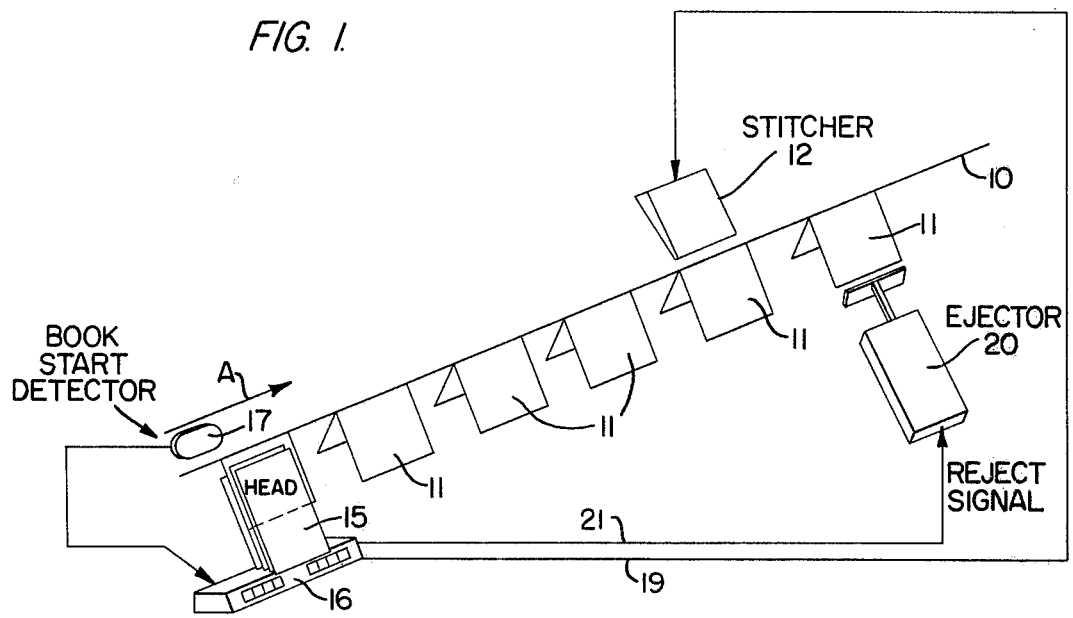
FIG. 1 is a schematic diagram of a bindery stitching line incorporating a detector and control system in accordance with the present invention.

As seen in FIG. 1, a typical bindery line comprises a conveying chain 10 carrying books 11 in a sequence at regularly spaced intervals to a stitcher 12, the direction of flow of the books being indicated by the arrow A. For purposes of measuring the number of pages or other characteristics relating to the physical thickness of each book 11, there is provided in accordance with the present invention a bindery calipering system including a capacitive detecting head 15 associated with a control system 16 which is responsive to variations in the capacitance of the detecting head 15 as each book passes therethrough to determine the acceptability of the book being measured. A book start detector 17 indicates to the control system 16 when a book is positioned for measurement within the capacitive detecting head 15 thereby initiating the measuring cycle performed by the control system 16.

When a book is found to have less than the required number of pages, or an excess of pages, or other measured abnormality, on the basis of the capacitance measured by the detector head 15, the control circuit 16 will identify the book as unacceptable and generate a stitcher inhibit signal which is applied on line 19 to the stitcher 12, positioned upstream of an ejector 20. The control circuit 16 includes a suitable storage arrangement, such as a shift register, which delays the generation of the stitch inhibit signal subsequent to detection of the unsatisfactory book until that book is positioned along the bindery line opposite the stitcher 12. Accordingly, the stitch inhibit signal prevents the operation of the stitcher 12 for that particular book.

Subsequent to generation of the stitch inhibit signal, a reject signal is also applied from the control circuit 16 via line 21 to actuate the ejector 20 to eject the unstitched book 11 from the chain 10. Once again, the memory device in the control system 16 delays the reject signal for a predetermined time period subsequent to generation of the stitch inhibit signal.

In accordance with the system illustrated in FIG. 1, by examining the capacitance variation as the book page is passed through the air gap of the parallel plate capacitor formed within the detector head 15, which variations in pages create a related dielectric variation which in turn affects the capacitance of the detecting head 15, the control circuit 16 operates to determine whether the measured capacitance falls within a range indicating an acceptable book or falls outside of the acceptable range to indicate that the book is unacceptable for some reason, such as improper page count or the presence of pages of undesired thickness. When an undesirable book 11 has been detected, the control circuit 16 waits until the undesirable book has been conveyed by the chain 10 to a position opposite the ejector 20 and then generates a reject signal on line 19 to operate the ejector 20 to push the book 11 from the chain.

Figure 2:
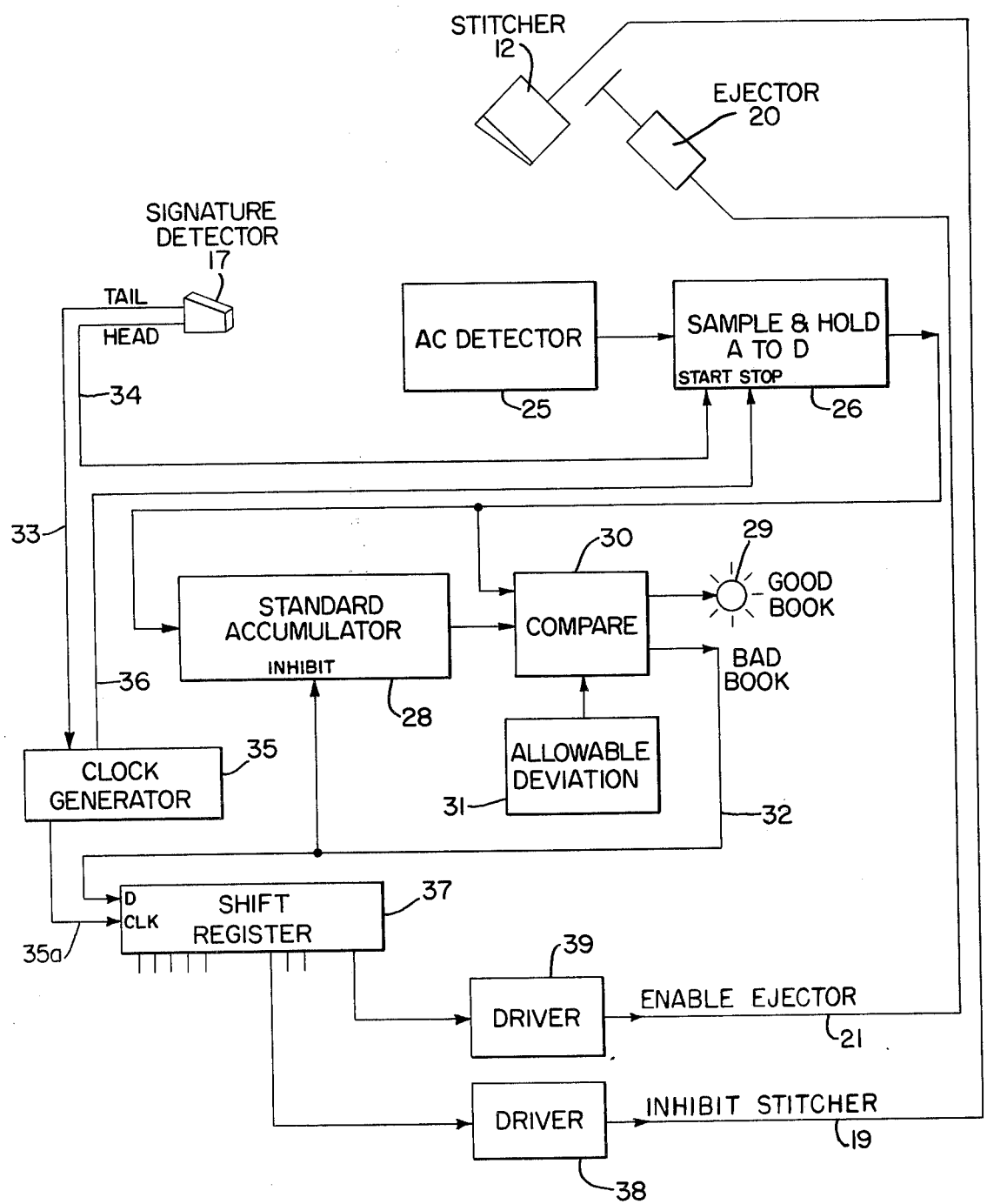
FIG. 2 is a schematic block diagram of a detector and control system forming one embodiment of the present invention.

FIG. 2 illustrates an example of the control circuit 16 of FIG. 1. A detector circuit 25 detects the variation in capacitance of the detector head 15 as the book passes therethrough and provides this measurement in the form of an analog signal to the sample and hold circuit 26 where the signal is converted to digital form. A comparator circuit 30 receives the output from the sample and hold circuit 26 at one input thereof and a standard value from register circuit 28 at a second input thereof. The comparator 30 then compares the measured capacitance with the standard value on the basis of a predetermined allowable deviation provided by circuit 31 to determine whether the book is a "good book", in which case an output is provided to indicator 29, or a "bad book", in which case an output is provided on line 32. The allowable deviation circuit 31 may be provided in the form of a plurality of settable switches providing a digital value indicating an allowable deviation or range within which the measured value may vary from the standard value without indication that the book is a "bad book".

Each signal on line 32 is applied to the input of a shift register 37 which is driven from the clock generator 35 at a rate corresponding to the rate of movements of the books along the bindery line between the capacitive detecting head 15 and the stitcher 12. Thus, the respective stages of the shift register 37 may be visualized as corresponding to the book locations along the chain 10, as seen in FIG. 1. An impulse from line 32 will therefore enter the shift register 37 and be shifted down by the applied clock pulse 35a until it reaches an output to the drive circuit 38, generates the inhibit stitcher signal applied on line 19 to the stitcher 12 to inhibit operation of the stitcher. The pulse continues to travel through the shift register 37 until it later reaches an output to the drive circuit 39, which produces the reject signal, applied on line 21 to enable the ejector 20.

In order to provide an update for the standard value to reflect gradual variations in individual sheet thickness, temperature, humidity and circuit drift, the register circuit 28 includes an accumulator which accumulates the values provided from sample and hold circuit 26 for ten consecutive measurements of acceptable books and updates the standard value supplied from the register circuit 28 on the basis of the average of these ten measurements. However, each time an unacceptable book is detected, as determined from the output on line 32 from the comparator circuit 30, this output is supplied to an inhibit input of the register circuit 28 which resets the accumulator therein, so that ten consecutive measurements of only acceptable books are relied upon for updating or varying in any way the standard values supplied from this circuit to the comparator 30. Any other convenient number of books may utilized for obtaining this standard. Of course, it is also possible to utilize the output on line 32 to prevent application of the measuring signal from the sample and hold circuit 26 to the accumulator in register circuit 28 rather than resetting the circuit. In this way, a more frequent updating of the standard value would be accomplished.

The timing of the circuit illustrated in FIG. 2 is controlled on the basis of the output from book start detector 17 which provides an output on lead 34 to enable the sample and hold circuit 26 when the leading edge of the book is detected and provides an output on line 33 to the clock generator 35 when the rear edge of the book is detected. The clock generator 35, in response to the signal on lead 33, provides an output on lead 36 at the leading edge of the next clock pulse to stop the sample and hold circuit 26. In this way, the variation in capacitance provided by the detector 25 will be received and operated on by the sample and hold circuit 26 only so long as the entire book is passing under the detector 17.

It is also possible in accordance with the present invention to provide only a single output from the detector 17 indicating detection of the leading edge of the book and including in the control circuitry a counter responsive to this output for enabling the sample and hold circuit 26 for a predetermined period of time sufficient to obtain a satisfactory measurement from the detector circuit 25.

Figure 3A:
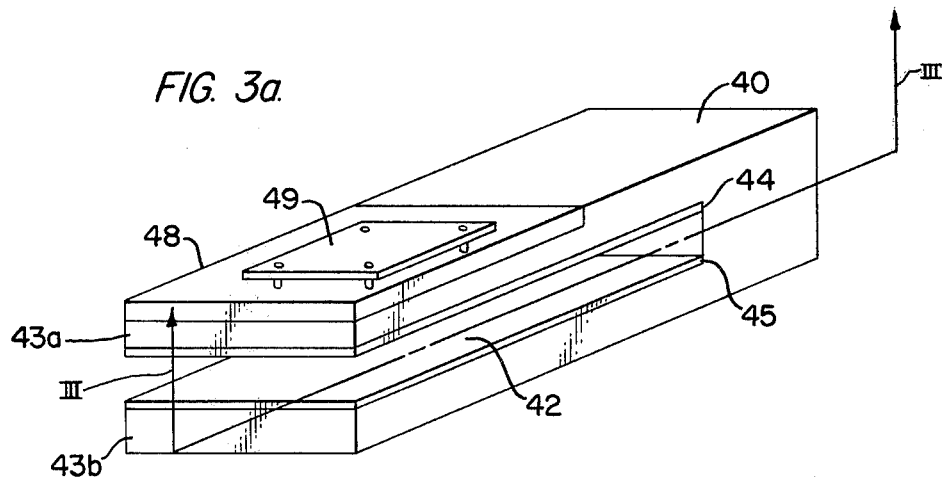
FIG. 3a is a perspective view of one example of a capacitive detector head which may be used in accordance with this invention.
Figure 3B:
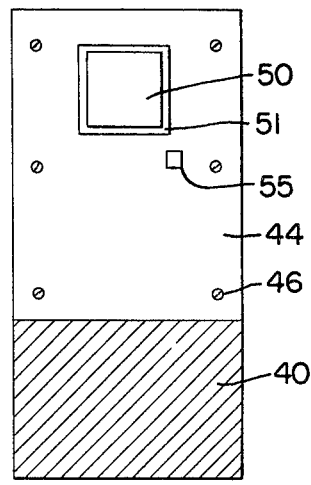
Figure 3C:
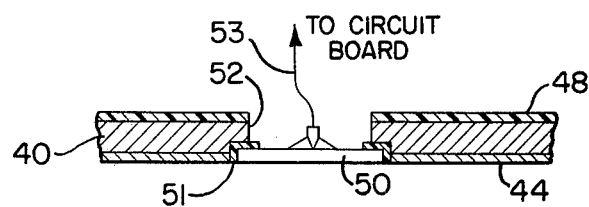
FIG. 3c is a detail sectional view of a portion of the capacitive detector head showing the capacitive plate construction.

FIGS. 3a, 3b, and 3c illustrate one example of the capacitance detector head which may be provided in accordance with the present invention. As seen in FIG. 3a, the head comprises a metal block 40 of aluminum, for example, which may be either cast or milled to provide a central slot 42 extending longitudinally into the block from one end thereof so that a pair of legs 43a and 43b are disposed on either side of the slot 42 in spaced parallel relationship. The walls of the slot 42 are lined by a pair of stainless steel shims 44 and 45, which are secured to the respective legs 43a and 43b, as seen in FIG. 3b, by screws 46 or other conventional fastening means. In the top of the block 40 there is also provided a rectangular recess in which there is disposed a board 48 of insulating material upon which a circuit board 49 carrying some of the control system circuitry may be mounted. Preferably, a formed shield (not shown) of aluminum or stainless steel is disposed over the insulator board 48 to provide electromagnetic shielding for the components disposed on the circuit board 49. A large space is utilized to minimize stray capacitance between the sensitive plate and ground.

The respective upper and lower legs 43a and 43b on either side of the slot 42 carry a capacitive plate in the manner shown in FIGS. 3b and 3c. The capacitive plate 50 is mounted in an aperture 52 in the leg 43a and is spaced therefrom by an insulating spacer 51, which may be formed of Mylar or similar suitable insulating material. A lead 53 connects the capacitive plate 50 to the circuitry provided on the circuit board 49 mounted on the insulating board 48, as seen in FIG. 3a. The lower leg 43b carries the other capacitive plate in the same manner illustrated in FIGS. 3b and 3c, the two plates being positionally disposed so as to be in alignment on either side of the slot 42.

The spacing between the shims 44 and 45 in the slot 42 of the capacitive detecting head is dimensioned to accommodate the book thickness as well as provide maximum efficiency in detecting capacitive variation during the measurement operation. In the preferred embodiment, a spacing of 9/16th of an inch is provided for the slot 42; however, various book thicknesses will require different plate spacings, which will necessitate different oscillator frequencies for the various spacings, as is well known. Adaptive circuitry may be used to accommodate operation of the caliper at these different frequencies.

Figure 4:
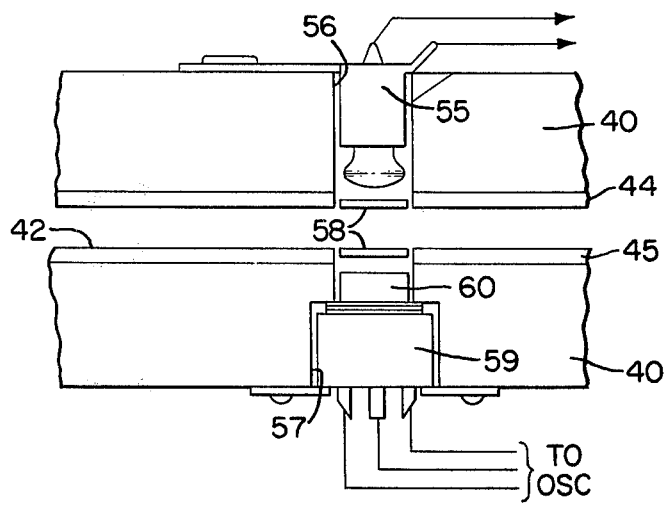
FIG. 4 is a detail sectional view of one example of a book start detector arrangement which may be directly incorporated in the capacitive detector head.

The book start detector 17 which detects the presence of the book in the vicinity of the capacitive detecting head 15 may be mounted separately from the head 15, as illustrated in FIG. 1, or it may be integrated directly into the head 15 in the manner illustrated in FIG. 4. A pair of aligned through apertures 56 and 57 are provided in the upper and lower legs 43a and 43b of the block 40 on either side of the slot 42. In the slot 56 there is mounted a socket, lamp and lens combination 55 providing a light source for directing a light beam across the slot 42 through a self-cleaning window 58. In the aperture 57 there is provided a phototransistor 60 mounted on a socket 59 so as to receive light from the light source 55. The leads from the transistor socket 59 extend to the circuit board 49 and are connected to the input of the system control circuit disposed thereon. By suitably positioning the book detector arrangement in the capacitive detector head 15, the presence of the book will be detected at the proper time to effect measurement of the variation in capacitance produced thereby providing a count of the number of pages of the book as required.

Figure 5:
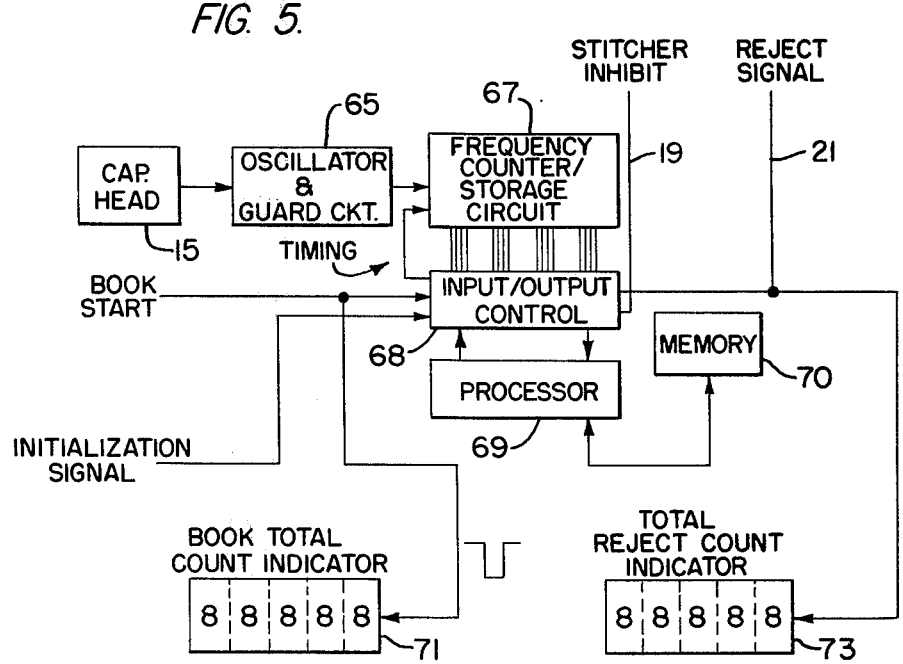
FIG. 5 is a schematic block diagram of another embodiment of the control system of the present invention using a microprocessor.

FIG. 5 is a block diagram of another embodiment of the control system of the present invention in which the required measurement is performed under control of a microprocessor system. The capacitive detector head 15 is connected to an oscillator and guard circuit 65, the output signal from which has a frequency determined by the capacitance of the detector head 15. This output signal from the oscillator circuit 65 is applied to a frequency counter and storage circuit 67 which has been preset to a standard value by the input/output control circuit 68 under control of a microprocessor 69 having an associated memory circuit 70. A book total count indicator 71 provides an indication of the total number of books which have been measured by the system, and a total reject count indicator 73 provides an indication of the number of measured books which have been rejected by the system. The input/output control circuit 68 forms a standard interface between the microprocessor 69 and circuit 67 to effect transfer of data and control signals therebetween.

In operation of the circuit of FIG. 5, the input/output control circuit 68 applies to the frequency counter and storage circuit 67 the standard value corresponding to the proper measured count of pages for the books being measured under control of the microprocessor 69. When a book start pulse is received from the book start detector, the indicator 71 is incremented and the input/output control 68 will enable the output of the oscillator and guard circuit 65 to be applied to the frequency counter and storage circuit 67. The output signal from the circuit 65, whose frequency is determined by the capacitance measured by the detector head 15, will count down the value in the circuit 67 for a predetermined time determined by the program of the microprocessor 69.

At the end of the measured time, the count remaining in the circuit 67 will represent the difference between the standard value and the gated detector head oscillator pulses. This value will be compared by the microprocessor 69 with a tolerance value indicating the allowable deviation of the measurement based upon variations in paper, temperature, humidity and other factors. On the basis of this comparison, the microprocessor 69 will control the input/output control circuit 68 to generate, for measurements indicating that the book is unacceptable, a reject signal on line 21 to the ejector circuit and an inhibit signal on line 19 to the stitcher. At the same time, the indicator 73 will be incremented.

During start-up, the system will be initialized by a signal applied to the microprocessor 69 through the input/output control circuit 68 to insert in the frequency counter and storage circuit 67 a standard value derived from memory 70 in accordance with the microprocessor program. During subsequent operations, this standard value will be updated by the microprocessor 69 through averaging of the measurements received in connection with acceptable books. Using this microprocessor technique, modification in the measurement standard and in the measurement limits or deviation can be affected by software changes in a much more simple manner and on a more frequent basis. In addition, changes in the parameters of the measuring system with use of detector heads having different sized slots to accommodate books of different sizes can be effected more simply by merely changing the data stored in the memory 70 or by affecting program changes rather than changes in hardware.

Figure 6:
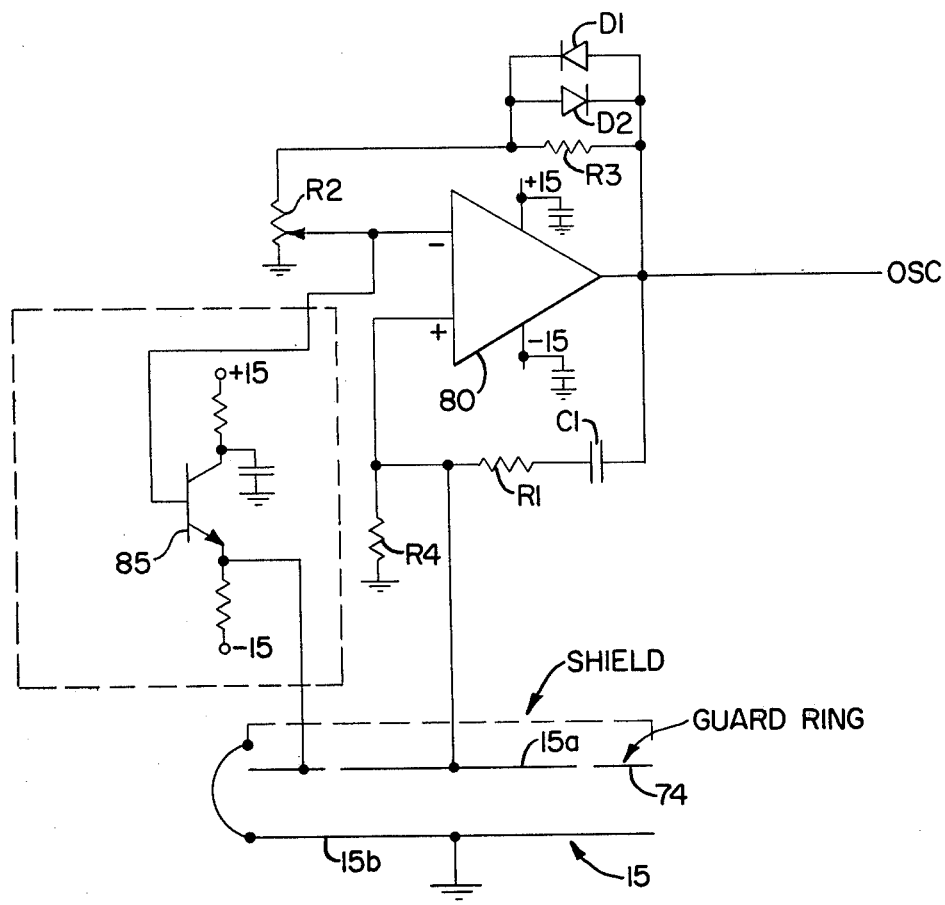
FIG. 6 is a schematic circuit diagram of one example of the guard amplifier and oscillator circuit associated with the capacitive detector head.

One example of the oscillator and guard circuit 65 is illustrated in FIG. 6. This circuit takes the form of a wein bridge oscillator circuit including an operational amplifier 80 whose non-inverting input is connected to one capacitive plate 15a of the capacitor head 15, the other capacitive plate 15b of which is connected to ground. The output of amplifier 80 is connected to the non-inverting input thereof via capacitor C1 and resistor R1 and is connected to the inverting input through variable resistor R2 in series with resistor R3, across which reversely poled diodes D1 and D2 are connected. A resistor R4 is connected from the non-inverting input to ground.

Since the respective inputs to the operational amplifier will be substantially equal to one another in the circuit of FIG. 6, the voltage at the inverting input will be the same magnitude and phase as is on the sensor plate 15a. Thus, the inverting input of amplifier 80 is connected through the emitter follower circuit 85 to the guard ring 74 and the shields for the various leads to the oscillator to drive these elements to the same voltage as the plate 15a. This increases the sensitivity of the measurement and eliminates inaccuracies introduced by capacitance in the leads of the oscillator circuit.

Figure 7:
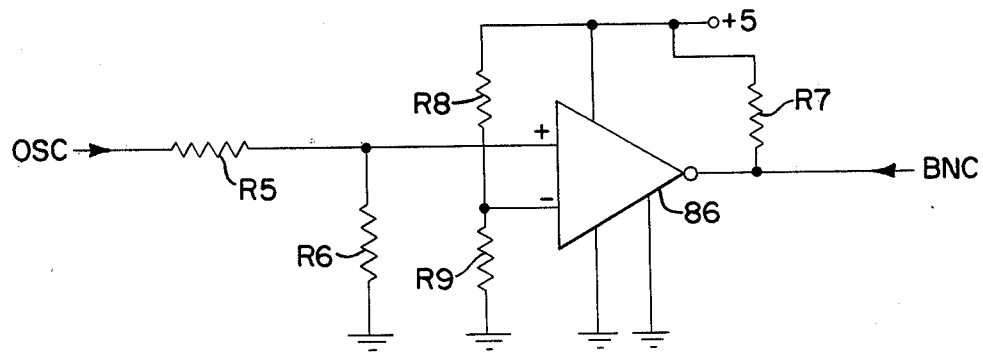
FIG. 7 is a schematic circuit diagram of an output interface circuit associated with the guard amplifier and oscillator circuit of FIG. 6.

FIG. 7 illustrates an example of an interface circuit which may be connected to the output of the oscillator circuit of FIG. 6. An operational amplifier 86 has its non-inverting input connected through resistor R5 to the output of the oscillator circuit 80 and through resistor R6 to ground. The inverting input of amplifier 86 is connected through identical resistors R8 and R9 to positive voltage and ground, respectively. The output of amplifier 86 is also connected through resistor R7 to positive voltage.

Figure 8A:
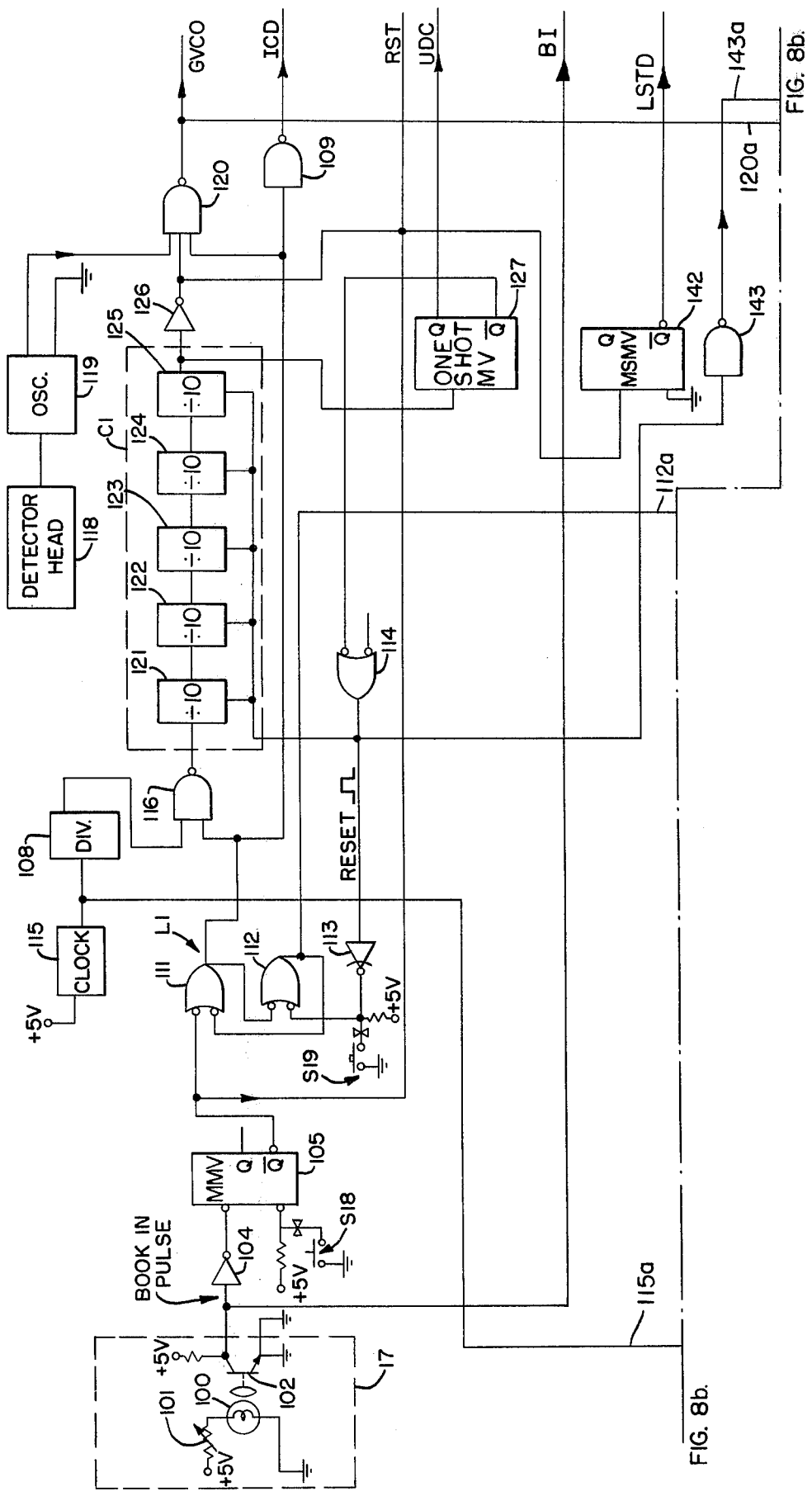

FIGS. 8a through 8d show another example of the logic control circuit in accordance with the present invention. As seen in FIG. 8a, the book-in detector circuit 17 includes a lamp 100 connected in series with a variable resistor 101 across a suitable voltage source to provide a light beam which is projected across the path of the oncoming books conveyed along the bindery line. A photodiode 102 is positioned opposite the lamp 100 to receive the beam of light therefrom in the absence of a book intercepting the light beam as it travels along the bindary line. The emitter of the photodiode is connected to ground, while the collector thereof is connected through resistor 103 to suitable voltage supply.

The book-in pulse derived from the collector of photodiode 102 in the book-in detector circuit 17 is applied through an inverter 104 to a monostable multivibrator 105, which is provided to allow for selection of a delay between receipt of the book-in pulse from circuit 17 and the desired start of data measurement. This delay may not be necessary if the book-in detector 17 is integrated in the capacitive detector head, in the manner illustrated in FIG. 4, at a point wherein the book will be detected and measurement started only when the book is completely within the capacitive detector head. In which case, the monostable multivibrator 105 could be omitted from the control circuit.

The $\overline{Q}$ output of the multivibrator 105 is applied to a latch L1 comprising gates 111 and 112, the outputs of which serve to initiate and control the measurement operation in response to the received book-in pulse and an applied reset pulse derived from inverter 113 or a manual reset switch S19.

The capacitance of the detector head 118 serves to vary the frequency of oscillator 119, which provides a measure of the number of pages in the book passing therethrough in the manner already indicated. The output of oscillator 119 is applied to one input of NAND gate 120, a second input of which is connected to the output of gate 111 in the latch L1 and is enabled at the start of the measurement operation. The third input to the NAND gate 120 is derived from the output of a counter C1, which is driven by a crystal oscillator 115 applied through divider 108 and NAND gate 116, also enabled from the output of the gate 111 in the latch L1. The counter C1 is made up of five stages 121–125 of 10:1 dividers to produce a 50 ms window for enabling the NAND gate 120 to sample the output of the oscillator 119. A monostable multivibrator 127 is connected to the output of the last stage 125 of the counter C1 to produce a reset signal at its $\overline{Q}$ output, which is applied through gate 114 and inverter 113 to reset the latch L1 and to reset the counter C1 at the end of the 50 ms time period.

The gated pulses from the head oscillator appearing at the output of NAND gate 120 are applied to one input of NAND gate 129 (FIG. 8b), the other input of which is enabled from the output of gate 112 in latch L1 via inverter 128. These gated pulses are applied through the enable NAND gate 129 and gate 134 to an up/down counter C2 comprising stages 130–133 which are caused to count up or down depending on the output of gate 112 of latch L1. The counter C2 counts up during the 50 ms sampling period and stores the pulses from the head oscillator received during the 50 ms period determined by the counter C1. If it is determined that the measurement relates to a book having the required number of pages, i.e., a good book, the contents of the counter C2 will be divided by ten and transferred to a standard accumulation register where the values for ten good books will be stored or accumulated to update the standard used in the measurement. This is accomplished by applying clock pulses from the clock 115 (FIG. 8a)

through NAND gate 135 (FIG. 8b) to a 10:1 divider 139. The clock pulses at the output of gate 135 are also applied to the counter C2 via gate 134.

With resetting of the latch L1 in FIG. 8a, the output of gate 112 thereof will cause the counter C2 to count down and also directly effect enabling of the gate 135. Thus, as the clock pulses from the clock 115 are applied to the divider 139, the counter C2 will be counted down from its previously set count until it reaches a zero value. The zero count of the counter C2 is detected by a gate 145 which sets flip-flop 147 via inverter 146. The setting of flip-flop 147 then inhibits gate 135 via inverter 148 to prevent further clock pulses from being applied to the divider 139.

Figure 8B:
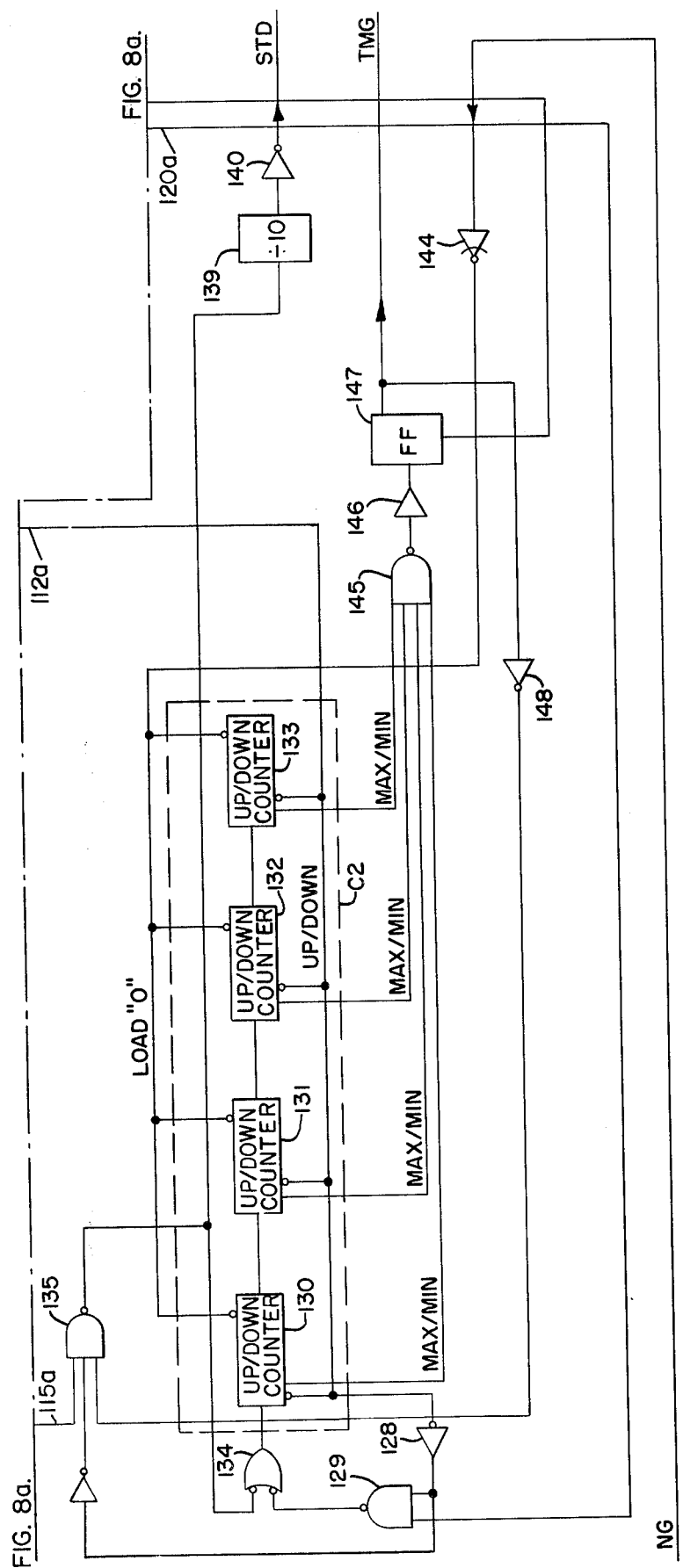

As seen in FIG. 8c, the standard accumulation register R1, which is made up of stages 150–153, receives the divided clock pulses from the divider 139 via inverter 140 in FIG. 8b when the measurement indicates that a book has the required number of pages. When ten measurements of good books have been accumulated in the register R1, a monostable multivibrator 154 (FIG. 8d) will generate a load pulse on line 154a to load the contents of the register R1 via inverters into a standard register R2, comprising latch stages 156–159. At the same time, the load pulse on line 154b will trigger monostable multivibrator 155 to generate a reset pulse on line 155a to reset the stages 150–153 of the standard accumulation register R1.

As seen in FIG. 8a, at the beginning of the measurement operation, the output of monostable multivibrator 105 will trigger monostable multivibrator 142 to generate a load pulse LSTD for effecting a loading of the standard stored in the latch register R2 (FIG. 8c) into an up/down counter C3 made up of stages 170–173. The up/down operation of the counter C3 is controlled by NAND gate 165 whose output is applied through an inverter 166 to flip-flop 167. The output of flip-flop 167 is applied through inverter 168 to control each of the stages 170–173 to either produce up counting or down counting. When the gate 120 in FIG. 8a is enabled, the gated oscillator pulses (GVCO) are applied to the counter C3 to count down from the standard value supplied to the standard register R2. At the end of the 50 ms period, the difference between the standard and gated head oscillator pulses will remain in the counter C3 and will be compared to a tolerance value to determine whether the book is acceptable or unacceptable. The tolerance value is selected by a plurality of manually operable switches S1–S16 and the comparison is performed by comparators 175–178.

The output 178a of the last comparator stage 178, which output indicates whether the book is a good book or a bad book, is applied through an inverter 180 (FIG. 8d) and gate 181 to one input of a NAND gate 182. A gate 183 receives the output of flip-flop 127 in FIG. 8a at the end of the 50 ms gating period and applies this output through a delay 184 to effect a 200 nanosecond delay in the sampling of the measurement. The output of delay circuit 184 is applied to the other input of NAND gate 182 to enable the gate which then supplies the indication from comparator stage 178 of whether the measurement designates a good book or bad book to flip-flop 190. If a good book is designated, flip-flop 190 will set providing an output to NAND gate 192, which is enabled from the output of flip-flop 147 in FIG. 8b. The output of gate 192 will be applied through inverter 185 to the 10:1 divider circuit 186, which will determine when ten good indications have been received and set the MSMV 154 in response thereto.

The indication of a good book received at the output of gate 182 and applied to flip-flop 190 is also applied as a good book pulse to a shift register R3, which is clocked through inverter 191 from the book-in pulses received from the output of the book in detector 17 in FIG. 8a. The shift register R3 provides sixteen outputs from which may be selected the outputs to produce the reject pulse and the stitcher inhibit signal.

Figure 8D:
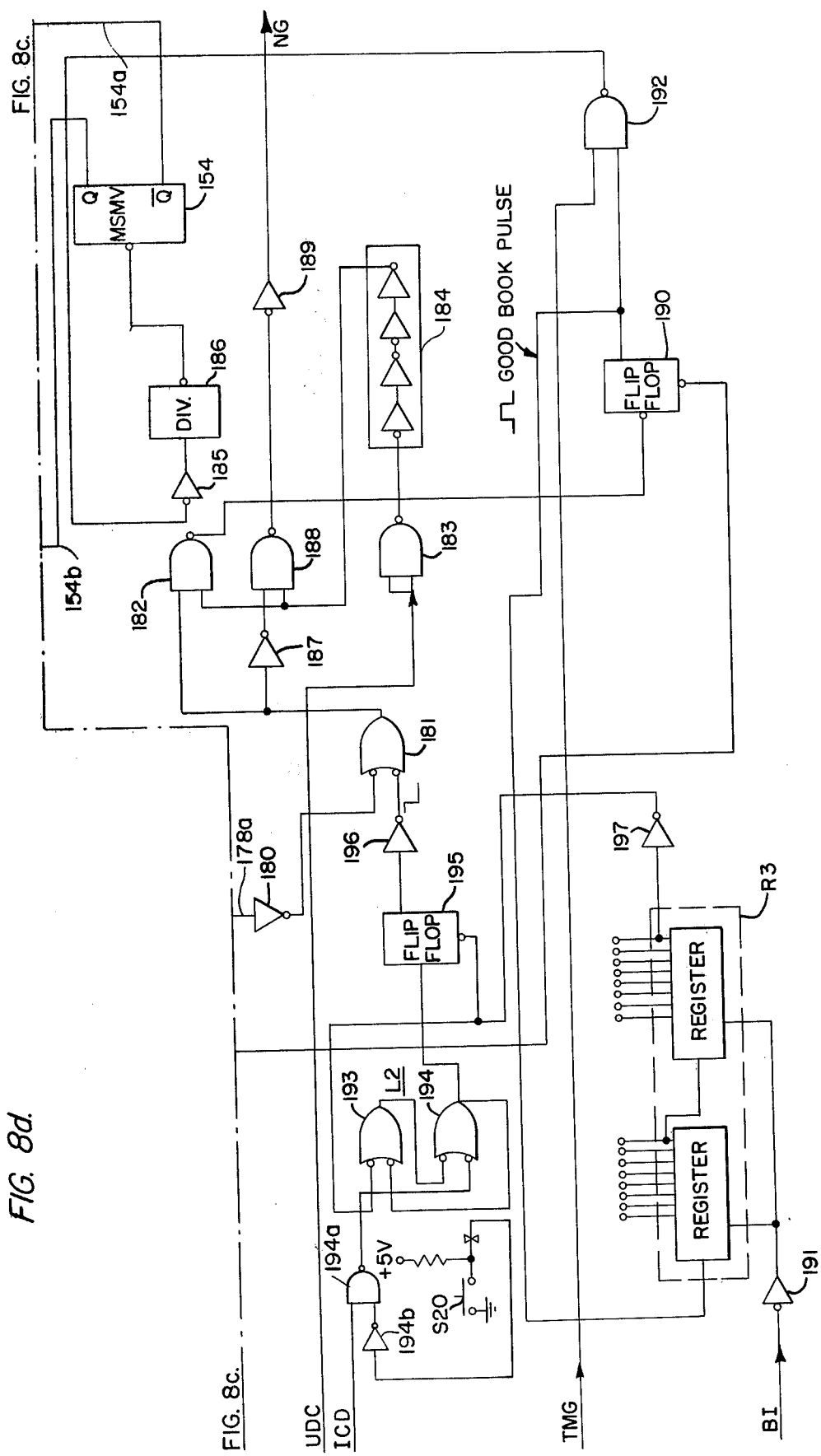

A latch L2 comprising gates 193 and 194 is provided in FIG. 8d in connection with a manual control switch S20 NAND gate 194a and inverter 194b. The switch S20 is used during system start-up to force an acceptable standard into the system. The ICD input from FIG. 8a applied to NAND gate 194a inhibits the "force accept" standard until completion of the 50 ms count period. By setting the latch L2, a flip-flop 195 is set to produce an output via inverter 196 to gate 181 which will provide a good book indication overriding the result of the comparison operation. When the good book pulse produced by flip-flop 190 has traveled through the shift register R3, indicating the passage of sixteen books, an output via inverter 197 will reset the latch L2 permitting the system to then control itself with respect to the determination of the standards.

In considering the operation of the system of FIGS. 8a through 8d, first assume that the counter C1 and the latch L1 have been reset via gate 114 and flip-flop 190 providing the good book pulse has been reset from the output 143a of gate 143. The output of MSMV 105 will be applied to the flip-flop 142, which produces a load pulse (LSTD) at its Q output to the up/down counter C3 to load the standard from the latch R2 into the counter C3. The system then waits for the next book to be detected.

When the book-in detector 17 detects the presence of a book in the capacitive detector head, a book-in pulse is applied through inverter 104 to the monostable multivibrator 105 which sets the latch L1. The output of gate 111 in latch L1 performs two functions at this time; it first enables the NAND gate 116 to apply clock pulses from the clock 115 to the counter C1 and also enables the gate 120 to apply the gated pulses from the head oscillator 119 to the counter C3. Since the counter C3 has been loaded with a standard value, the gate 165 will detect a non-zero condition to produce an output via inverter 166 to the flip-flop 167, which is low. This flip-flop provides an output through inverter 168 to set each of the stages of the counter C3 to a count down condition. The gated pulses from the output of gate 120 will therefore effect a countdown of the standard value in the counter C3.

At the end of 50 ms the counter C1 will reach its maximum value producing an output which is inverted by the inverter 126 to disable the NAND gate 120 and prevent further gated pulses from the oscillator 119 from being applied to the counter C3. At the same time, the output from the last stage 125 of the counter C1 will set the MSMV 127 effecting a resetting of the counter C1 and the latch L1 via the gate 114 as well as application of a compare/enable signal (UDC) to gate 183 and delay 184 to effect enabling of the gate 182 after a 200 nanosecond delay. The value which appears in the counter C3 at the end of the 50 ms window is then compared with a tolerance value supplied from manually settable switches S1–S16 in the comparator 175–178. If this value is within the tolerances selected within the system, an output 178a will be provided from stage 178 of the comparators through inverter 180 and gate 181 to the NAND gate 182 indicating that a good book has been detected. Upon enabling of the gate 182 after the 200 nanosecond delay, an output will be provided to set the flip-flop 190 producing a good book pulse which is applied to the input of the shift register R3. In a similar manner, if the system indicates that the book is a bad book because the page count does not correspond to that required or because of the presence of certain pages of undesirable thickness, the output of gate 182 will not set flip-flop 190 providing no good book pulse to the input of the register R3. The register R3 will then be shifted by the book-in pulse via gate 191 to indicate at that stage either a good book or a bad book depending upon the value of the signal applied thereto.

At the beginning of the measurement cycle, the output 112a from gate 112 in latch L1 will be applied to each of the stages 130-133 of counter C2 to set the counter stages in the count up condition. The output 120a of gate 120 which provides the gated oscillator pulses (GVCO) will then be applied through gate 129 which is also enabled from the output 112a of gate 112 in latch L1 via inverter 128, to the input of the counter C2 through gate 134. The counter C2 will then count the pulses during the 50 ms period determined by the counter C1. During this time, gate 135 is inhibited by the output of flip-flop 147 through inverter 148 and through inverter 128. When the latch L1 is reset, the output 112a from gate 112 therein will shift the counter C2 to a count down condition and disable the NAND gate 129, while enabling gate 135 to apply the output 115a from the clock 115 to the divider 139. The output of gate 135 is also applied through gate 134 to the input of the counter C2, which is then counted down to a zero condition. The output of divider 139 is applied through inverter 140 to the standard accumulation register R1 which accumulates the divided value. When the counter C2 reaches the zero value, the gate 145 will detect this condition providing an output through inverter 146 to set flip-flop 147, which in turn, provides an output through inverter 148 to inhibit gate 135 preventing further clock pulses from being applied to the divider 139.

On the other hand, if the book measurement indicates a bad book, an output will be provided from the last comparator stage 178 through inverter 180, gate 181, and inverter 187 to NAND gate 188. This gate will be enabled by the delayed compare signal received through gate 183 and delay circuit 184 to provide an output through inverter 189 and inverter 144 to set each of the stages 130-133 of the counter C2 to zero. This condition immediately results in a disabling of the gate 135. from the output of flip-flop 147 to prevent clock pulses from being applied to the divider 139. Thus, the measurement value is prohibited from being applied to the standard accumulation register R1.

As each good book measurement is provided from the output of the comparators through gate 182 to flip-flop 190, the count of these measurements is divided by the divider 186 until ten good book measurements have been detected. At this point, the divider 186 produces an output to trigger MSMV 154 which initiates the shifting of the value in the standard accumulation register R1 into the standard register R2 and a resetting of the register R1 from the output of flip-flop 155, as already described.

Thus, the present invention provides a non-contact system which is capable of measuring with very high sensitivity the number of pages of a book based upon a measurement of capacitance as the book passes between a pair of capacitor plates. The logic control system compares the measured value to a standard value taking into consideration preselected tolerance values to determine whether the book has the proper number of pages or not, or whether the measurement indicates the presence of abnormally thick pages, such as might result during a paper splice operation. In the course of successive measurements, the standard value is updated on the basis of accumulated good book measurements thereby providing a proper standard in spite of variations in measurement conditions.

While we have shown and described several embodiments in accordance with the present invention, it is understood that the same is not limited thereto but is susceptible of numerous changes and modifications as are obvious to one of ordinary skill in the art, and we therefore do not wish to be limited to the details shown and described herein but intend to cover all such changes and modifications as are obvious to those of skill in the art.

What is claimed is:

1. In a book binding apparatus of the type having means for conveying a series of unstitched books along an established path and means for stitching the books disposed at a location along said path, an improved page counting system for counting the pages in each book as it proceeds along the path on said conveying means comprising:
   (a) capacitor means having a pair of spaced conductive plates disposed along said path so that the pages of each book sequentially pass through the space between the plates as the books are conveyed by said conveying means to said stitching means;
   (b) oscillator means coupled to said capacitor means to form therewith an oscillator producing a variable frequency of oscillation proportional to the number of pages of a book passing between said conductive plates; and
   (c) means for comparing the frequency of oscillation of said oscillator with a standard to determine whether the total number of pages of each book is equal to the number designated by said standard.

2. The apparatus according to claim 1, further including book reject means responsive to said comparing means for rejecting any book carried by the conveying means having an improper page count, and further including
   (a) means for actuating said book stitching means when said comparing means establishes that the comparison is within a preselected tolerance to stitch the book whose pages have been counted; and
   (b) means for actuating the book reject means when the comparing means establishes that the comparison is in excess of a preselected tolerance to reject the book whose pages have been counted.

3. The apparatus according to claim 2 wherein the capacitor forms with said oscillator means a modified wein bridge oscillator.

4. The apparatus according to claim 2 wherein at least one plate of said capacitor means is coupled to said oscillator means by means of a shielded conductor having a shield and a signal conductor to which a voltage level is applied, and further including means for driving the shield of said shielded conductor to the same voltage level as the signal conductor thereof to reduce the effect of any shield to conductor capacitance.

5. The apparatus according to claim 4 wherein said driving means includes an operational differential amplifier.

6. The apparatus according to claim 1 wherein said comparing means is provided in the form of a program controlled microprocessor.

7. The apparatus according to claim 1, further including means for detecting the presence of a book pages between the plates of said capacitor means and means responsive to said detecting means for sampling the output of said oscillator for a predetermined period of time, the sampled output of said oscillator being applied to said comparing means.

8. The apparatus according to claim 7, wherein said comparator includes a counter, means for presetting said counter to a value corresponding to said standard, means responsive to said detecting means for applying the sampled output of said oscillator to said counter during said predetermined period to decrement said counter, and means for determining whether a book has the proper number of pages based on the value of said counter at the end of said predetermined period.

9. The apparatus according to claim 8, wherein said determining means includes means providing a preselected tolerance value and means for detecting whether the value of said counter at the end of said predetermined period is above or below said tolerance value.

10. The apparatus according to claim 7, further including means for counting the sampled oscillator output during each predetermined period for each book to produce a count of the sampled oscillator output, means for averaging the count obtained in connection with a plurality of books, and means for varying said standard value on the basis of said averaged count.

11. A book page counting system comprising:
(a) oscillator means for producing an output signal whose frequency is related to the thickness of the stack of paper formed by the pages of a book, said oscillator means including a capacitor having a nominal dielectric and including a pair of spaced parallel plates, the space between said plates normally being filled with air and being of a width adequate to permit insertion of the book pages therebetween so that the paper thickness affects the nominal dielectric of the capacitor and thus the magnitude of capacitance whereby variations in capacitance vary the frequency of the oscillator means in an inverse relation; and
(b) means for comparing the frequency of the oscillator means with a standard oscillator frequency produced by a book having the proper number of pages thereby to establish whether the book has the proper number of pages.

12. The system of claim 11 wherein said comparing means includes means for detecting whether the difference between said oscillator means frequency and said standard oscillator frequency is less than or greater than a preselected tolerance value to determine whether the book has or has not the proper number of pages, respectively.

13. The system of claim 11, further comprising means for detecting the passage of a stack of paper between the plates of said capacitor, and means responsive to said detecting means for gating the output of said oscillator means to said comparing means for a predetermined period of time.

14. The system of claim 13, further comprising a counter, logic control means responsive to said detecting means for applying the output of said gating means to said counter during said predetermined period, said counter producing a count of the output of said gating means in response thereto, averaging means for averaging the count reached by said counter during a plurality of predetermined periods, and means for varying said standard oscillator frequency in accordance with said averaging means.

15. The system of claim 13 wherein said capacitor is embodied in a detector head in which said plates are mounted on opposite parallel walls of a slot in a support body, said detector means being mounted in said support body in proximity to said capacitor plates.

16. A system for counting the number of sheets in a stack by measuring the electrical capacitance of said stack comprising
a capacitor including a pair of parallel conductive plates spaced sufficiently to permit a stack of sheets to pass therebetween;
conveying means for conveying stacks of sheets successively between said conductive plates;
oscillator means coupled to said capacitor to form therewith an oscillator producing an output frequency which varies inversely with the capacitance of said capacitor:
stack detector means for detecting the passage of a stack of sheets between the plates of said capacitor;
comparator means responsive to said stack detector means for comparing the frequency of said oscillator with a standard value; and
count verification means for determining whether the difference between said oscillator frequency and said standard value as determined by said comparator means is less than or greater than a preselected tolerance value to determine whether the stack has or has not the proper number of pages.

17. The system according to claim 16 wherein the capacitor forms with said oscillator means a Wein bridge oscillator.

18. The system according to claim 16 wherein at least one plate of said capacitor means is coupled to said oscillator means by means of a shielded conductor having a shield and a signal conductor to which a voltage level is applied, and further including means for driving the shield of said shielded conductor to the same voltage level as the signal conductor thereof to reduce the effect of any shield to conductor capacitance.

19. The system according to claim 18 wherein said driving means includes an operational differential amplifier.

20. The system according to claim 16, further including sampling means responsive to said stack detector means for gating the output of said oscillator to said comparator means for a predetermined period of time.

21. The system according to claim 20 wherein said comparator means includes counter means for counting the gated output pulses of said oscillator, said counter means producing a count value representative of the number of gated output pulses counted thereby, and means for comparing the count value in said counter means at the end of said predetermined period of time with a standard value.

22. The system according to claim 20 wherein said comparator means includes a counter, means for presetting said counter to a standard value, and means for applying the gated output pulses of said oscillator to said preset counter during said predetermined period of time to decrement said counter, said preset counter producing a count of said gated output pulses in response thereto.

23. The system according to claim 22, further including standard register means for storing said standard value, averaging means for averaging the count of said gated oscillator pulses for a preselected number of stacks having the proper number of pages to produce and store a value representative thereof, and transfer means for periodically replacing the contents of said standard register means with the value stored by said averaging means to update said standard value.

24. The system according to claim 23 wherein said averaging means includes an additional counter, logic control means responsive to said stack detector means for applying the gated oscillator pulses to said additional counter during said predetermined period of time, said additional counter producing a count of the gated oscillator pulses applied thereto,
additional register means, divider means for dividing the count of said additional counter by a preselected number, and means responsive to said count verification means determining that a stack has the proper number of pages for applying the divided count of said additional counter from said divider means to said additional register means.

25. The system according to claim 24 wherein said count verification means includes means for counting the stacks which are determined to have the proper number of pages, said transfer means being responsive to said counting means reaching a count equal to said preselected number for transferring the value stored by said additional register means to said standard register means.

26. The system according to claim 25, wherein said count verification means further includes manually settable switch means for determining said preselected tolerance value.

* * * * *